(12) United States Patent
Tsukiyoshi (10) Patent No.: US 10,347,878 B2
(45) Date of Patent: Jul. 9, 2019

(54) BATTERY TERMINAL COVER AND BATTERY PROVIDED THEREWITH

(71) Applicant: Sumitomo Wiring Systems, Ltd., Yokkaichi, Mie (JP)

(72) Inventor: Keiichi Tsukiyoshi, Mie (JP)

(73) Assignee: Sumitomo Wiring Systems, Ltd. (JP)

( * ) Notice: Subject to any disclaimer, the term of this patent is extended or adjusted under 35 U.S.C. 154(b) by 202 days.

(21) Appl. No.: 15/294,821

(22) Filed: Oct. 17, 2016

(65) Prior Publication Data

US 2017/0125750 A1    May 4, 2017

(30) Foreign Application Priority Data

Nov. 4, 2015    (JP) ................................ 2015-216600

(51) Int. Cl.
     *H01M 2/04*      (2006.01)
     *H01M 2/06*      (2006.01)
     *H01M 2/30*      (2006.01)

(52) U.S. Cl.
     CPC ............... *H01M 2/04* (2013.01); *H01M 2/06* (2013.01); *H01M 2/30* (2013.01)

(58) Field of Classification Search
     CPC ............. H01M 2/04; H01M 2/06; H01M 2/30
     See application file for complete search history.

(56) References Cited

U.S. PATENT DOCUMENTS

| 2,671,819 | A | * | 3/1954 | Field | H01M 2/04 137/560 |
|---|---|---|---|---|---|
| 5,439,759 | A | * | 8/1995 | Lippert | H01M 2/32 174/138 F |
| 5,576,516 | A | * | 11/1996 | Kameyama | H01M 2/32 174/138 F |
| 5,804,770 | A | * | 9/1998 | Tanaka | H01M 2/206 174/138 F |
| 5,902,695 | A | * | 5/1999 | Siedlik | H01M 2/32 429/181 |
| 5,910,029 | A | * | 6/1999 | Siedlik | H01M 2/32 174/138 F |
| 5,977,485 | A | * | 11/1999 | Yoshimura | H01M 2/206 174/135 |
| 6,512,177 | B2 | * | 1/2003 | Kosuge | H01R 11/284 174/135 |

(Continued)

FOREIGN PATENT DOCUMENTS

JP      2004-355908      12/2004

*Primary Examiner* — Carlos Barcena
(74) *Attorney, Agent, or Firm* — Gerald E. Hespos; Michael J. Porco; Matthew T. Hespos (57) ABSTRACT

A battery terminal cover (10) for accommodating a battery terminal (30) to be connected to a battery post (42) includes a main body (11) with a first accommodation space (18) for accommodating the battery terminal (30) and an opening (19) for opening the first accommodation space (18) to outside. A lid (21) is displaceable between a closing position for closing the opening (19) and an opening position for opening the opening (19). Hinges (25) project from outer surfaces of the main body (11) and the lid (21) and couple the main body (11) and the lid (21). Projections (26) project from the outer surface of the main body (11) near the hinges (25) and have a projecting dimension equal to or larger than that of the hinges (25).

10 Claims, 11 Drawing Sheets

(56) References Cited

U.S. PATENT DOCUMENTS

| | | | | |
|---|---|---|---|---|
| 2002/0168566 A1* | 11/2002 | Ohtsuka | ............... | H01M 2/043 |
| | | | | 429/175 |
| 2011/0059352 A1* | 3/2011 | Lee | .................... | H01M 2/0202 |
| | | | | 429/164 |
| 2011/0315431 A1* | 12/2011 | Mase | ...................... | H01R 4/34 |
| | | | | 174/138 F |
| 2015/0303438 A1* | 10/2015 | Choo | ................... | H01M 2/305 |
| | | | | 429/65 |
| 2016/0254502 A1* | 9/2016 | Yamazaki | ............ | H01M 2/043 |
| | | | | 429/175 |

* cited by examiner

BATTERY TERMINAL COVER AND BATTERY PROVIDED THEREWITH

BACKGROUND

1. Field of the Invention

The invention relates to a battery terminal cover and to a battery provided therewith.

2. Description of the Related Art

Japanese Unexamined Patent Publication No. 2004-355908 discloses a battery terminal cover for accommodating a battery terminal. The cover is a single part with a fastening portion to be fixed to the battery terminal and a cover lid body coupled to the fastening portion by a hinge. The cover lid body is displaced between a state for covering the battery terminal and a state for exposing the battery terminal to the outside while deforming the hinge. The hinge can be caused to project outside the cover. However, other members are likely to interfere with a hinge that projects outside the cover. The hinge is relatively thin so as to be easily deformable, and the thin hinge may be deformed or broken by interference of other members.

The present invention was completed based on the above situation and aims to improve operability by protecting the hinge that projects outside.

SUMMARY

The invention relates to a battery terminal cover for accommodating a battery terminal to be connected to a battery post. The battery terminal cover includes a main body with an accommodation space for accommodating the battery terminal and an opening for opening the accommodation space to the outside. A lid is displaceable between a closed position for closing the opening and an opening position for opening the opening. A hinge couples the main body and the lid while projecting from outer surfaces of the main body and the lid. A projection projects from the outer surface of the main body near the hinge and has a projecting dimension equal to or larger than that of the hinge.

Two projections may be arranged to substantially sandwich the hinge, thereby reliably preventing other members from interfering with the hinge.

The battery terminal cover may be mountable on a battery having a wall surface facing an outer peripheral surface of the battery post, and substantially parallel to a wall surface. The projection may substantially face the wall surface, and/or the projection may be formed with at least one guiding surface inclined with respect to the wall surface. According to this configuration, if the battery terminal and the battery terminal cover are going to be mounted on the battery while being displaced in position with respect to the battery post, the guiding surface slides in contact with an end edge of the wall surface. Thus, positional displacements of the battery terminal and the battery terminal cover are corrected.

The battery terminal cover may be mountable on a battery having a wall surface substantially facing an outer peripheral surface of the battery post. The projection may substantially face the wall surface and may be capable of contacting the wall surface when the orientation of the main body is changed about the battery post. The hinge may not come into contact with the wall surface when the projection contacts the wall surface. According to this configuration, the contact of the hinge with the wall surface can be prevented by the projection when the orientation of the main body is changed about the battery post.

The battery terminal cover may be mountable on a battery having a wall surface substantially facing an outer peripheral surface of the battery post. The projection may substantially face the wall surface and may be arranged at a position not corresponding to a normal drawn from the wall surface toward a center of the battery post (position deviated from the normal) on a plane of projection perpendicular to an axis line of the battery post. According to this configuration, even if an external force in a rotating direction centered on the battery post acts on the main body, the rotation of the main body can be prevented by the contact of the projection with the wall surface.

The invention also relates to a battery having a battery post to which a battery terminal is to be connected and the above-described battery terminal cover for at least partly accommodating the battery terminal. According to the above-described embodiments, overall operability can be improved by preventing the interference of other members with the hinge since the at least one projection projects near the hinge.

These and other features of the invention will become more apparent upon reading the following detailed description and accompanying drawings. It should be understood that even though embodiments are described separately, single features thereof may be combined to additional embodiments.

DETAILED DESCRIPTION

A first embodiment of the invention is described with reference to FIGS. 1 to 9. A battery terminal cover 10 of this first embodiment is to be mounted on a battery post 42 of a battery 40 e.g. of an automotive vehicle while accommodating a battery terminal 30. The battery post 42 projects from a front end part of the upper surface of a battery main body 41 with an axis line thereof extending in a vertical direction (see FIGS. 5 and 7). Note that, in the following description, an upper side in FIG. 5 is defined as a front side concerning a front-back direction.

Figure 5:
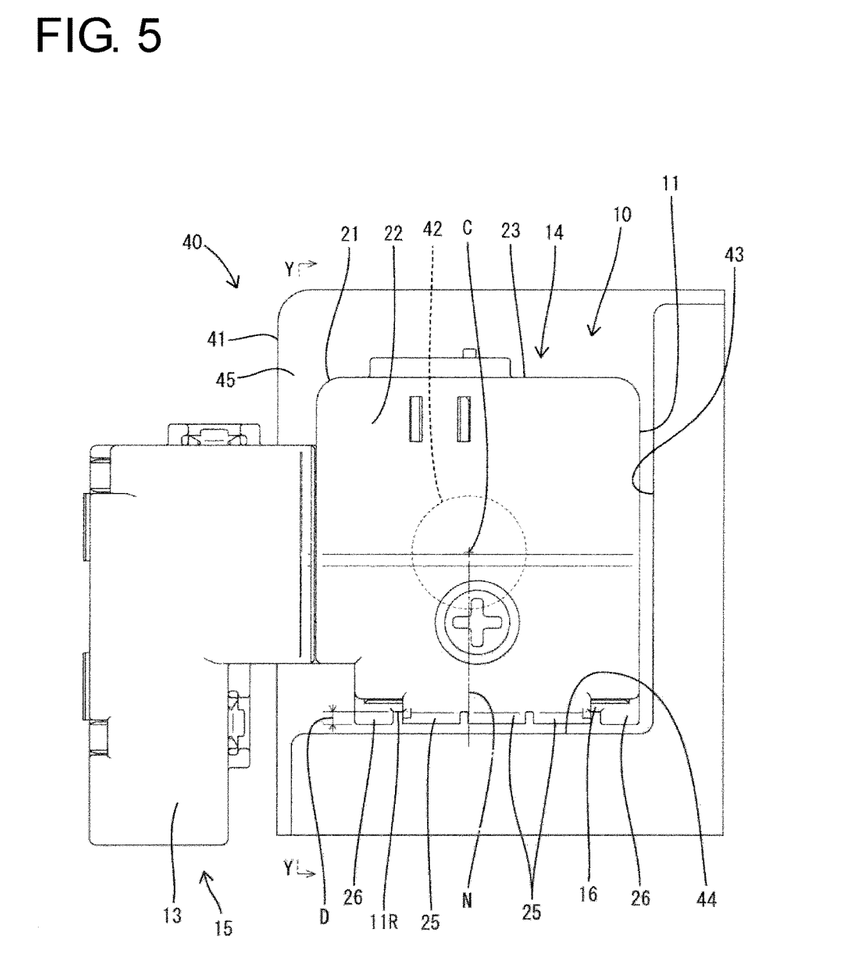
FIG. 5 is a plan view showing a state where the battery terminal cover and the battery terminal are mounted on a battery.

Further, as shown in FIG. 5, a right side wall surface 43 and a rear wall surface 44 (wall surface as claimed) facing the outer peripheral surface of the battery post 42 are formed on the upper surface of the battery main body 41. A space the right side wall surface 43 and the rear wall surface 44 are facing (space defined by the right side wall surface 43 and the rear wall surface 44) serves as a connection space 45 open forward, leftward and upward of the battery 40. The battery post 42 is arranged in this connection space 45. Further, a first accommodating portion 14 of the cover 10 is arranged from above the battery 40 (above the plane of FIG. 5) to be accommodated into the connection space 45.

Figure 1:
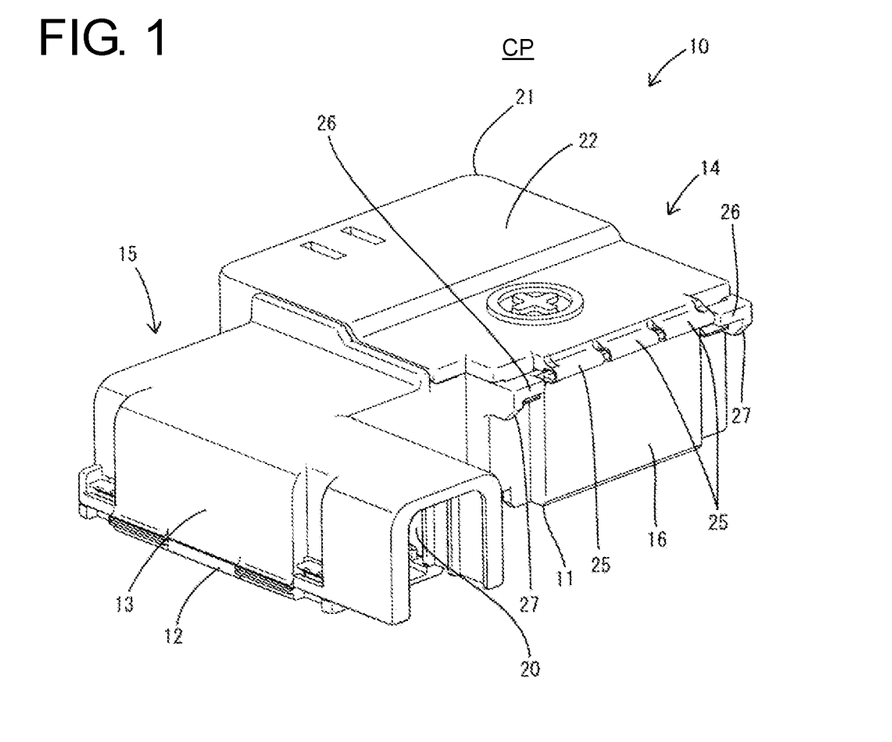
FIG. 1 is a perspective view of a battery terminal cover of a first embodiment.
Figure 8:
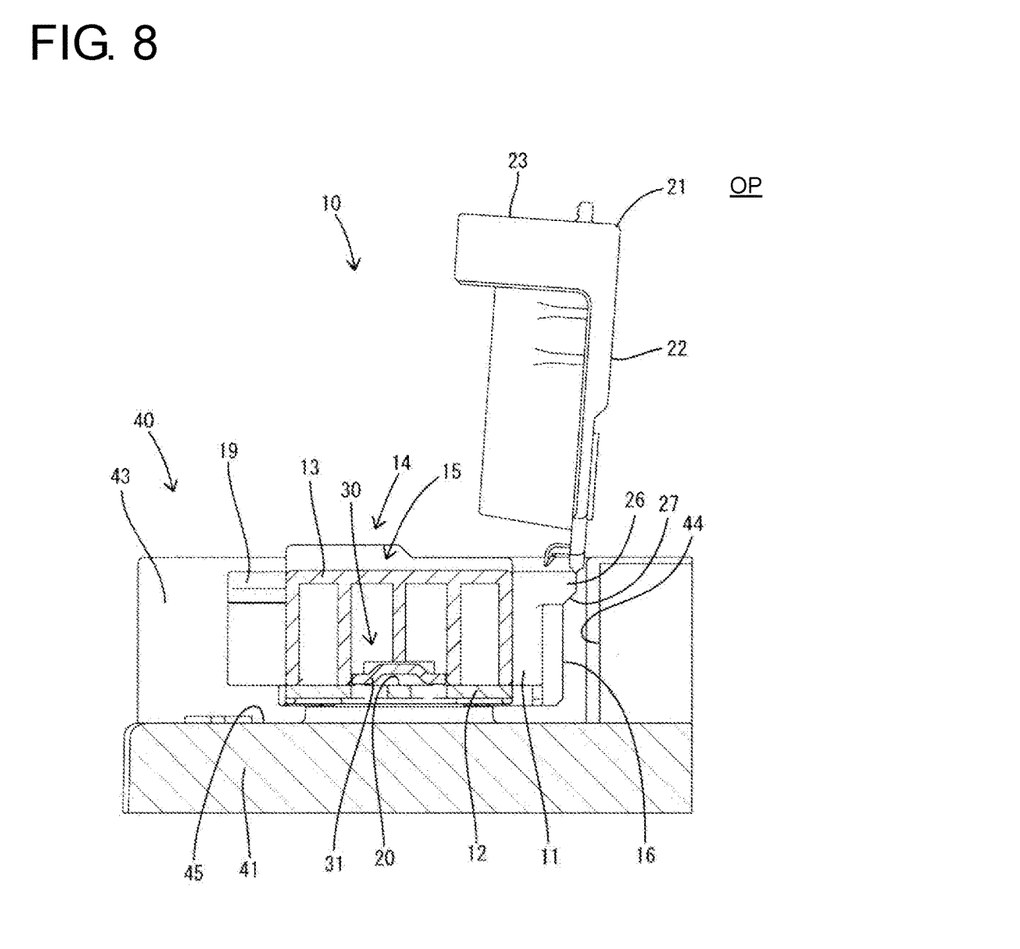
FIG. 8 is a section along Z-Z of FIG. 7.
Figure 9:
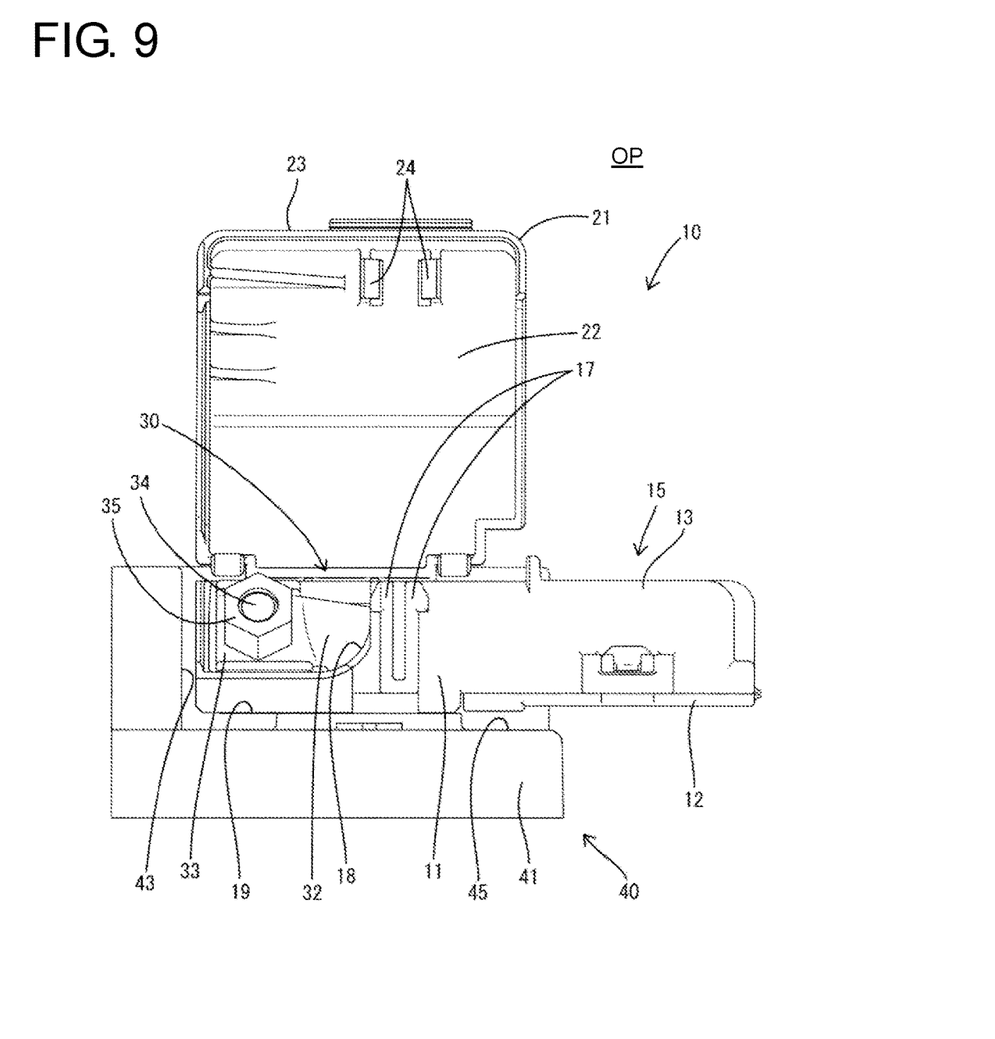
FIG. 9 is a front view showing the state where the battery terminal cover and the battery terminal are mounted on the battery and the lid portion is displaced to the opening position.

The cover 10 is made of insulating synthetic resin and has a main body 11, a lid 21 and hinges 25 as shown in FIG. 1. As shown in FIGS. 8 and 9, the main body 11 has two members, i.e. a lower member 12 substantially in the form of a horizontal plate and a three-dimensionally shaped upper member 13 mounted to cover the lower member 12 from above. The main body 11 includes the box-shaped first accommodating portion 14 substantially rectangular in a plan view and a second accommodating portion 15 projecting from a left outer side surface of the first accommodating portion 14 and substantially L-shaped in a plan view. The first and second accommodating portions 14, 15 are both composed of a part of the lower member 12 and a part of the upper member 13.

Figure 4:
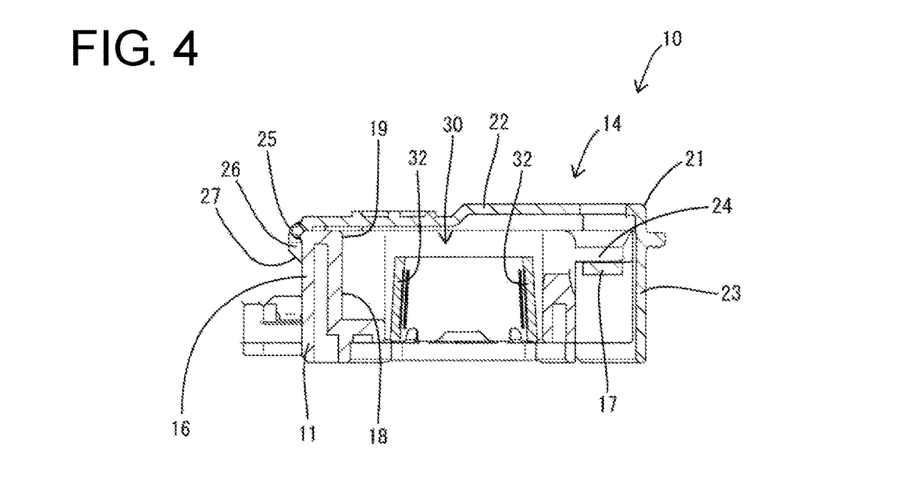
FIG. 4 is a section along X-X of FIG. 2.
Figure 7:
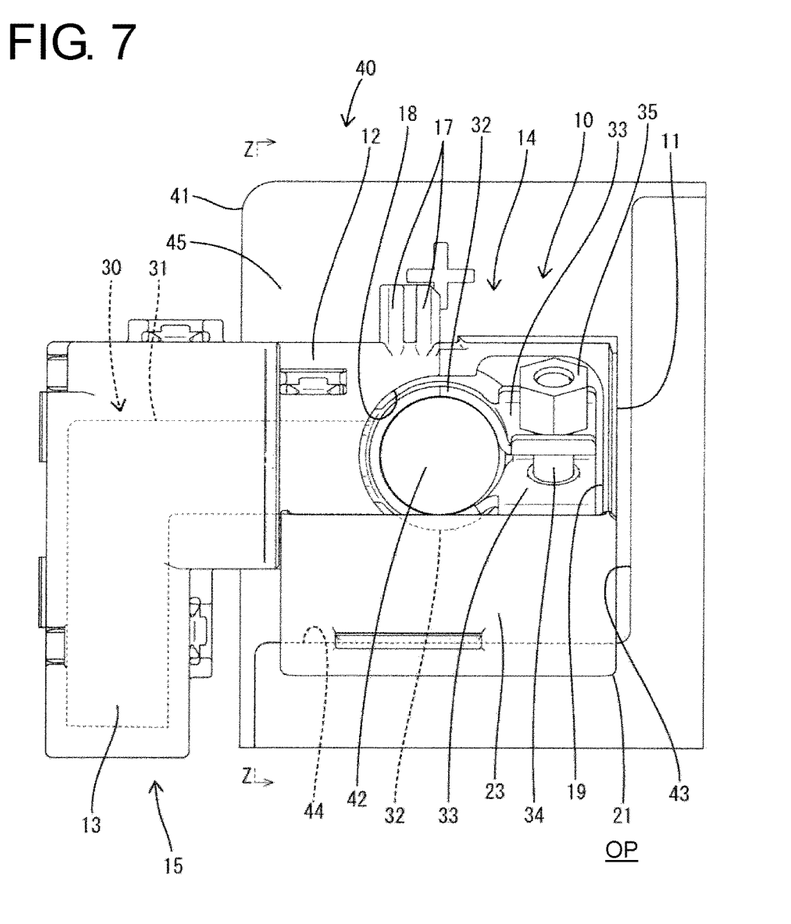
FIG. 7 is a plan view showing a state where the battery terminal cover and the battery terminal are mounted on the battery and a lid is displaced to an opening position.

The main body 11 (upper member 13) is formed with a rear wall 16 constituting the first accommodating portion 14. Likewise, a lock projection 17 is formed on a front end part of the first accommodating portion 14 of the main body 11 (upper member 13) (see FIGS. 2 and 4). The interior of the first accommodating portion 14 defines a first accommodation space 18. As shown in FIGS. 7 to 9, the first accommodation space 18 is open forward and upward of the cover 10 and this open area defines an opening 19 to be opened and closed by the lid 21, as described later. Further, as shown in FIG. 4, the first accommodation space 18 is also open on the lower surface of the cover 10. A second accommodation space 20 in the second accommodating portion 15 communicates with the first accommodation space 18 (see FIG. 7).

The lid 21 is relatively displaceable with respect to the main body 11 between a closing position CP for closing the opening 19 (see FIGS. 1 and 3 to 6) and an opening position OP for opening the opening 19 to the outside of the cover 10 (see FIGS. 7 to 9). As shown in FIG. 4, the lid 21 includes an upper plate 22 capable of closing the upper surface of the first accommodating portion 14 and a front plate 23 capable of closing the front surface of the first accommodating portion 14 and is substantially L-shaped in a side view. A locking claw 24 is formed on the inner surface of a front end part of the upper plate 22 and is lockable to the lock projection 17 of the main body 11 when the lid 21 is at the closing position CP. The lid 21 is locked at the closing position CP by the locking of the locking claw 24 and the lock projection 17.

As shown in FIG. 1, the lid 21 is coupled to the first accommodating portion 14 of the main body 11 via three hinges 25. The three hinges 25 are in the form of thin plate long and narrow in a lateral direction and identically shaped and dimensioned. The three hinges 25 are arranged side by side in a row along a length direction of the hinges 25. One side edge of each hinge 25 is connected to the upper end edge of the rear wall 16 of the main body 11 and the other side edge part thereof is connected to the rear end edge of the upper plate 22.

When the lid portion 21 is displaced between the closing position CP and the opening position OP, the hinges 25 are deformed and a position near these hinges 25 defines a support for displacement of the lid 21. Further, when the lid 21 is at the closing position CP, the three hinges 25 project back from an outer surface of the cover 10 (rear surface of the rear wall surface 44) while being curved to have a substantially semicircular shape in a side view as shown in FIGS. 1 and 4.

Figure 2:
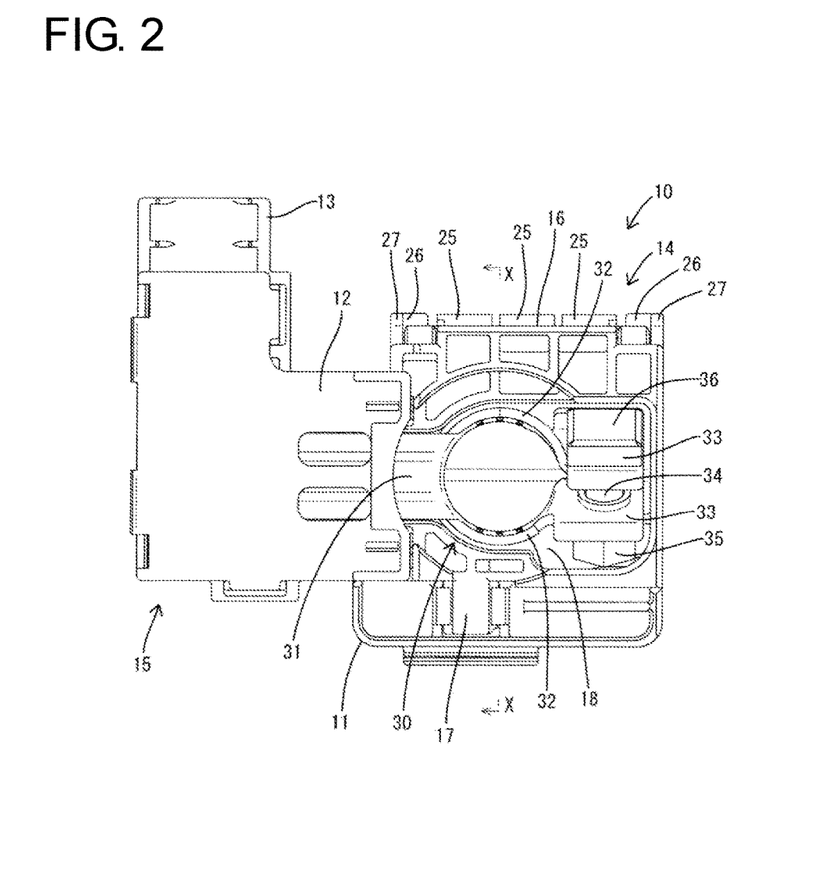
FIG. 2 is a bottom view showing a state where a battery terminal is accommodated in the battery terminal cover.

Two substantially bilaterally symmetrical projections 26 are formed as a means for protecting the three hinges 25 on the outer surface of the main body 11 (rear surface of the rear 16). As shown in FIGS. 1, 2 and 5, the projections 26 are arranged to collectively sandwich all the three hinges 25 from left and right sides. The pair of projections 26 are shaped and dimensioned identically. As shown in FIG. 5, a backward projecting dimension of the projections 26 from a rear surface 11R of the main body 11 (outer surface of the rear wall 16) as a reference is a dimension D equal to (or larger than) that of the hinges 25 from the rear surface 11R of the main body 11 as a reference when the lid 21 is at the closing position.

Figure 3:
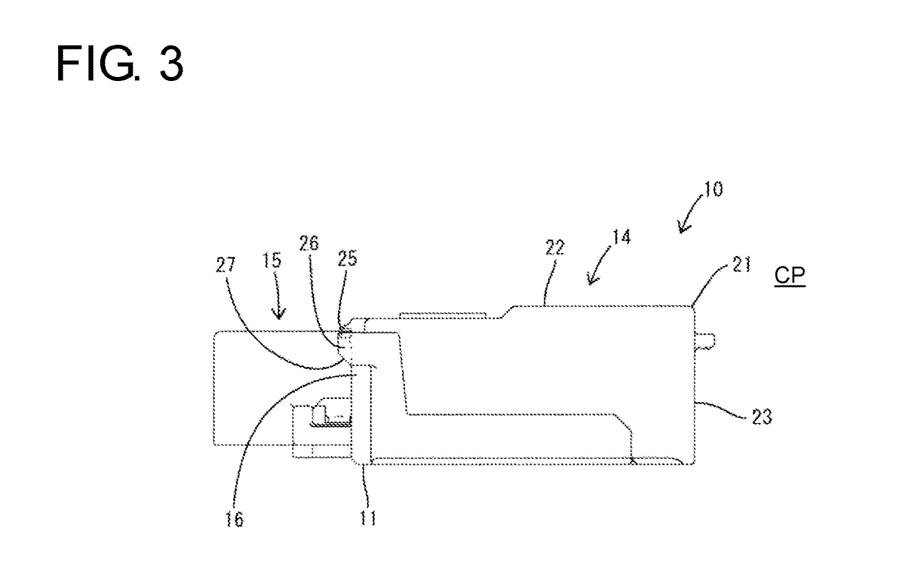
FIG. 3 is a side view of the battery terminal cover.

Further, as shown in FIG. 3, the projections 26 are formed at a position in the vertical direction to partially overlap the hinges 25. Specifically, the upper ends of the projections 26 are located slightly lower than the upper ends of the hinges 25, but higher than the lower ends of the hinges 25 when the lid 21 is at the closing position CP. Further, the lower ends of the projections 26 are lower than the lower ends of the hinges 25 when the lid 21 is at the closing position CP.

Further, each projection 26 is formed with a guiding surface 27. The guiding surface 27 is arranged in an area lower than the lower ends of the hinges 25 when the lid 21 is at the closing position CP. The guiding surface 27 is inclined with respect to the vertical direction and the front-back direction and is obliquely facing a lower rear side. In other words, the guiding surface 27 is inclined with respect to a mounting direction of the battery terminal 30 and the cover 10 onto the battery post 42.

Figure 6:
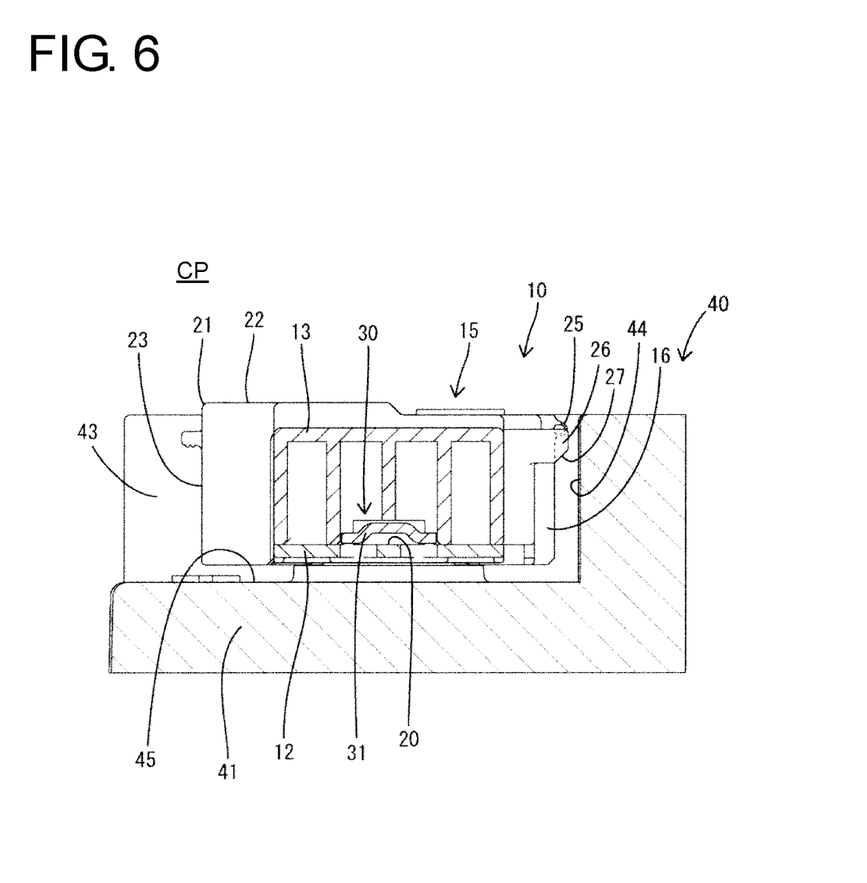
FIG. 6 is a section along Y-Y of FIG. 5.

As shown in FIG. 7, the battery terminal 30 includes a base 31 and front and rear fastening pieces 32. The base 31 is substantially L-shaped in a plan view and, as shown in FIGS. 6 and 8, accommodated in the second accommodation space 20 while being sandwiched between the lower member 12 and the upper member 13. The fastening pieces 32 are substantially semicircular in a plan view and cantilevered rightward from one end part of the base 31.

The fastening pieces 32 are accommodated in the first accommodation space 18 and a bolt 34 is passed through extending end parts 33 of the fastening pieces 32. When a nut 35 threadedly engaged with the bolt 34 is tightened, the both fastening pieces 32 are sandwiched between a head 36 of the bolt 34 and the nut 35 to be connected to the outer periphery of the battery post 42. This tightening operation of the nut 35 can be performed in a state where the lid 21 is displaced to the opening position to open the opening 19.

In connecting the battery terminal 30 and the cover 10 to the battery post 42, the battery terminal 30 is assembled with the cover 10 in advance and the lid 21 is locked at the closing position CP. Thereafter, the cover 10 is accommodated into the connection space 45 by being dropped from above the battery 40 while the battery post 42 is accommodated between the two fastening pieces 32. If the cover 10 is displaced backward (i.e. toward the rear wall surface 44) than a proper position in the process of accommodating the cover 10 into the connection space 45, the guiding surfaces 27 of the projections 26 slide in contact with the upper end edge of the rear wall surface 44, whereby the cover 10 is guided forward and corrected in position.

After the battery terminal 30 is fit externally to the battery post 42 and the cover 10 is accommodated into the connection space 45, the lid 21 is displaced (e.g. lifted) towards the opening position OP to open the opening 19 and the nut 35 in the first accommodation space 18 is tightened. In this way, the fastening pieces 32 (battery terminal 30) are conductively fixed to the battery post 42. By displacing the lid 21 towards or to the closing position CP after the connection of the battery terminal 30 to the battery post 42 is finished, the mounting operation of the battery terminal 30 and the cover 10 on the battery 40 is completed.

The hinges 25 and the projections 26 are proximately facing the rear wall surface 44 with the cover 10 accommodated in the connection space 45. That is, a small clearance is present between the projecting ends (rear ends) of the hinges 25 and the projecting ends (rear ends) of the projections 26 and the rear wall surface 44. Thus, the cover 10 (main body 11) may rotate in a horizontal direction with the battery post 42 as a supporting point.

However, when a normal N is drawn toward a center C of the battery post 42 from the rear wall surface 44 in a plan view (on a plane of projection perpendicular to the axis line of the battery post 42), as shown in FIG. 5, the projections 26 are at positions not corresponding to the normal N (i.e. positions laterally deviated from the normal N) in a circumferential direction (substantially lateral direction) of the battery post 42. Thus, even if the cover 10 rotates about the battery post 42, either one of the projections 26 butts against the rear wall surface 44 to restrict the rotation of the cover 10 when the cover 10 slightly rotates. Further, since the three hinges 25 are arranged between the two projections 26, none of the hinges 25 contacts the rear wall surface 44 until the projections 26 contact with the rear wall surface 44 and in a state where the projections 26 are in contact with the rear wall surface 44.

As described above, the cover 10 of this first embodiment is for accommodating the battery terminal 30 to be connected to the battery post 42 and includes the main body 11, the lid 21 and the hinges 25. The main body 11 includes the first and second accommodation spaces 18, 20 for accommodating the battery terminal 30 and the opening 19 for opening the first accommodation space 18 to the outside. The lid 21 is displaceable between the closing position CO for closing the opening 19 and the opening position OP for opening the opening 19. The hinges 25 project from the outer surfaces of the main body 11 and the lid 21 and couple the main body 11 and the lid 21.

The hinges 25 project outside (rearward) of the cover 10. Accordingly, the cover 10 includes the projections 26 projecting from the outer surface of the main body 11 near the hinges 25 and having the projecting dimension equal to (or larger than) that of the hinges 25 as a means for protecting the hinges 25. Accordingly, the projections 26 project near the hinges 25 and project interference of other members with the hinges 25. As just described, a function of protecting the hinges 25 by the projections 26 is exhibited not only in a step of mounting the cover 10 to the battery 40, but also in various other scenes. In addition, since the two projections 26 sandwich the hinges 25, the interference of other members with the hinges 25 can be prevented reliably.

Further, the cover 10 is to be mounted on the battery 40 having the rear wall surface 44 facing the outer peripheral surface of the battery post 42 while being slid substantially in parallel to the rear wall surface 44 (i.e. in the vertical direction parallel to the axis line of the battery post 42). The projections 26 are arranged to face the rear wall surface 44 with the cover 10 mounted on the battery 40. The projections 26 are formed with the guiding surfaces 27 inclined with respect to the rear wall surface 44. If the battery terminal 30 and the cover 10 are going to be mounted on the battery 40 while being displaced backward with respect to the battery post 42, the guiding surfaces 27 slide in contact with the upper end edge of the rear wall surface 44 so that positional displacements of the battery terminal 30 and the cover 10 are corrected.

Further, as described above, the cover 10 is mounted on the battery 40 having the rear wall surface 44 facing the outer peripheral surface of the battery post 42 and the projections 26 are arranged to face the rear wall surface 44 with the cover 10 mounted on the battery 40. The projections 26 are brought into contact with the rear wall surface 44 when the orientation of the main body 11 is changed about the battery post 42. The hinges 25 do not come into contact with the rear wall surface 44 when the projections 26 come into contact with the rear wall surface 44. According to this configuration, when the orientation of the main body 11 is changed about the battery post 42, the projections 26 come into contact with the rear wall surface 44, thereby preventing the hinges 25 from coming into contact with the rear wall surface 44.

Further, as described above, the cover 10 is mounted on the battery 40 having the rear wall surface 44 facing the outer peripheral surface of the battery post 42 and the projections 26 are arranged to face the rear wall surface 44 with the cover 10 mounted on the battery 40. The projections 26 are arranged at the positions not corresponding to the normal N drawn from the rear wall surface 44 toward the center C of the battery post 42 (positions deviated from the normal N) in a plan view, as shown in FIG. 5. According to this configuration, even if an external force in a rotating direction centered on the battery post 42 acts on the main body 11 and the main body 11 is going to rotate, the projections 26 come into contact with the rear wall surface 44, thereby being able to prevent any further rotation of the main body 11.

Figure 10:
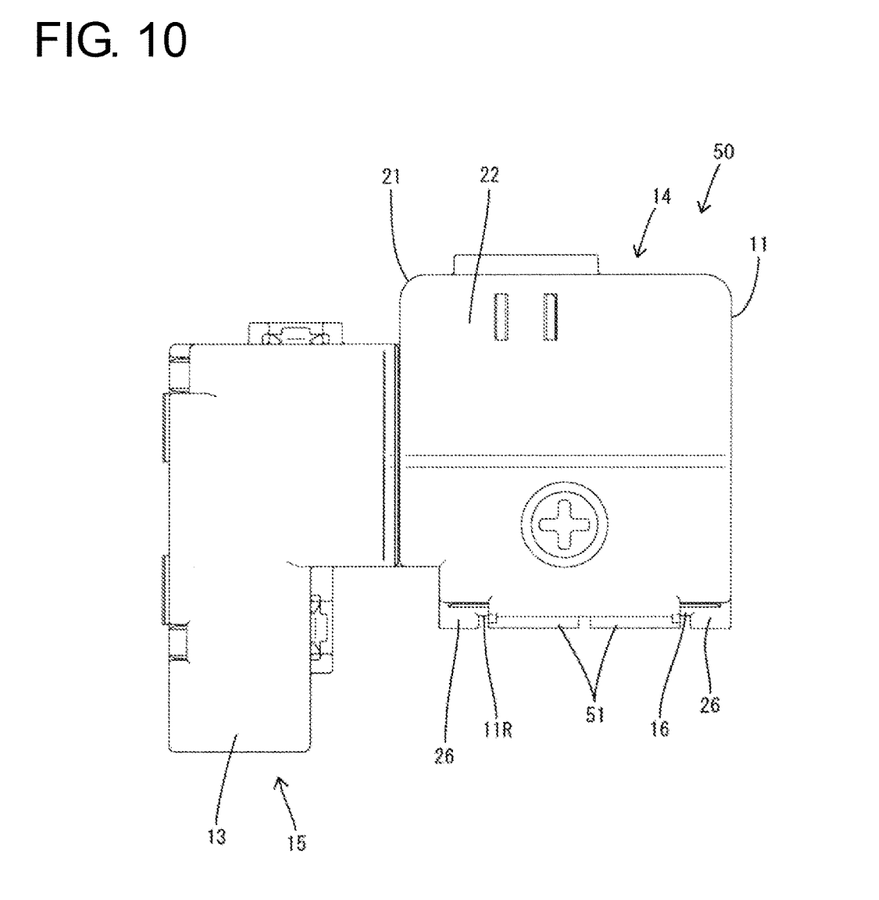
FIG. 10 is a plan view of a battery terminal cover of a second embodiment.
Figure 11:
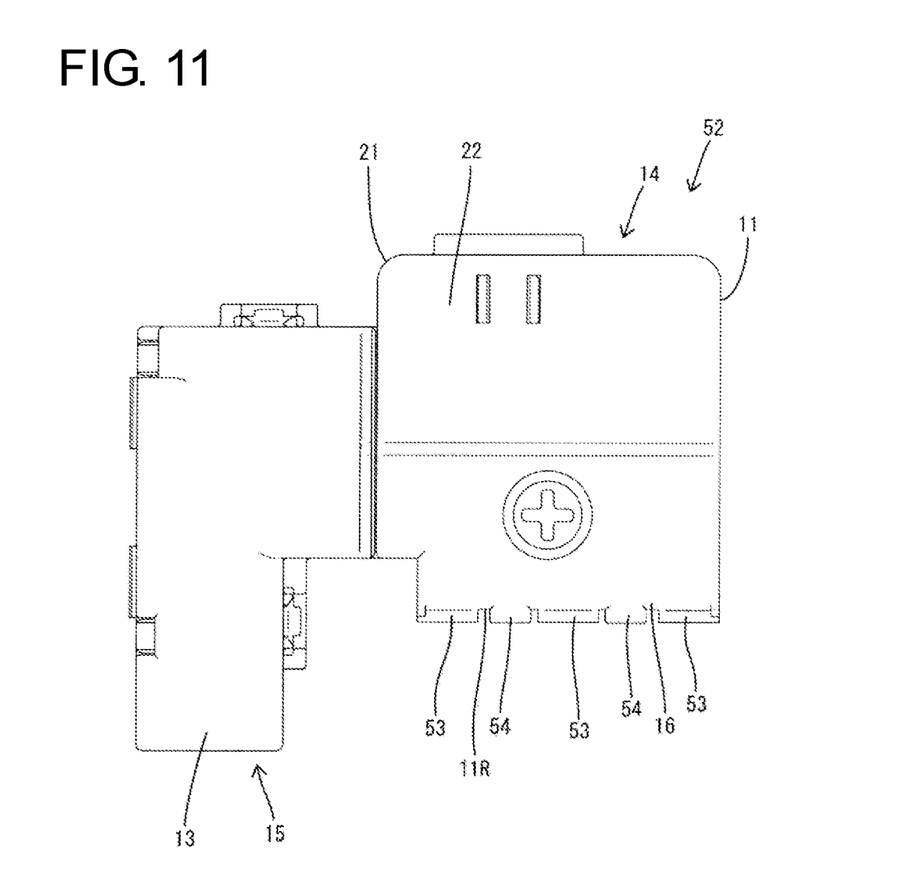
FIG. 11 is a plan view of a battery terminal cover of a third embodiment.
Figure 12:
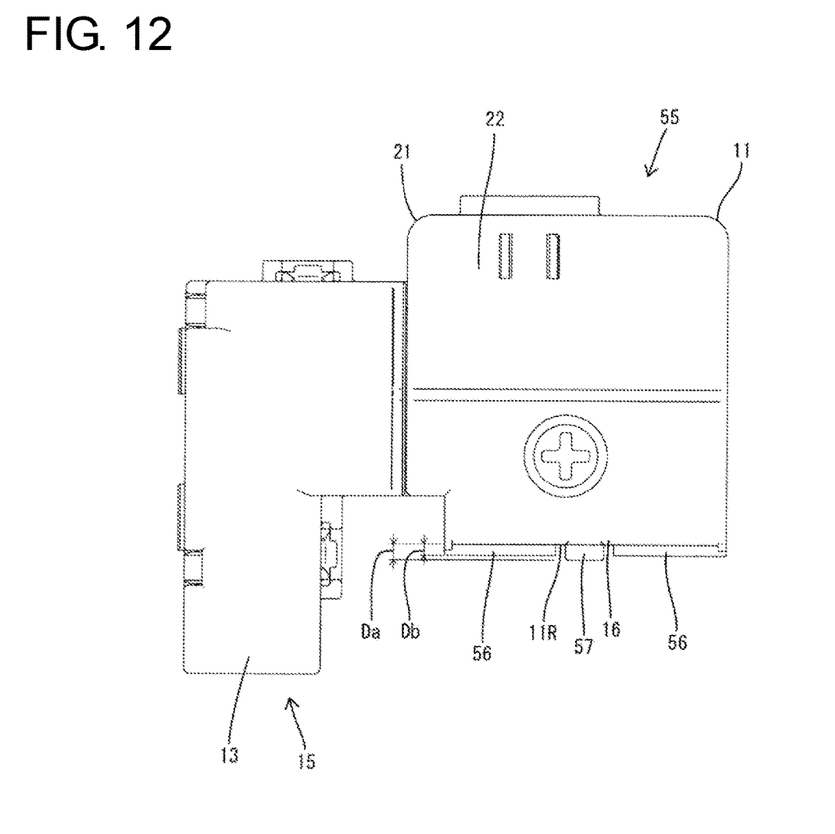
FIG. 12 is a plan view of a battery terminal cover of a fourth embodiment.

Next, second to fourth embodiments of the invention are described with reference to FIGS. 10 to 12. A cover 50 of the second embodiment includes two hinges 51 as shown in FIG. 10. Since the other configuration is the same as in the first embodiment, the same components are denoted by the same reference signs and the structures, functions and effects thereof are not described. In a cover 52 of the third embodiment, three hinges 53 are arranged side by side and two projections 54 are arranged between adjacent hinges 53 as shown in FIG. 11. That is, the center hinge 53 out of the three hinges 53 is arranged near the two projecting portions 54 while being sandwiched between the projections 54. In contrast, the hinges 53 on both left and right sides are arranged near only one projection 54 adjacent on a lateral central side. In a cover 55 of the fourth embodiment, one projection 57 is arranged between two hinges 56, as shown in FIG. 12. A backward projecting dimension Da of the projecting portion 57 from a rear surface 11R of a main body 11 as a reference is set larger than a projecting dimension Db of the hinges 56. Thus, the contact of the hinges 56 with a rear wall surface 44 can be prevented reliably.

The invention is not limited to the above described and illustrated first to fourth embodiments. For example, the following embodiments are also included in the scope of the invention.

The two projections sandwich the hinges in the first embodiment, but one projection may be arranged near the hinges.

The projection has the guiding surface in the first to fourth embodiments, but the guiding surface may be formed on a part different from the projection.

The battery terminal cover is applied to the battery including the wall surface facing the outer peripheral surface of the battery post in the first to fourth embodiments, but it can be also applied to batteries including no wall surface facing the outer peripheral surface of the battery post.

The projection is formed on the outer side surface of the main body in the first to fourth embodiments. However, it may be formed on the upper surface of the main body if the hinges are on the upper surface of the main body.

The projection is arranged at the position not corresponding to the normal drawn from the wall surface (position deviated from the normal) in the circumferential direction centered on the battery post in the first to fourth embodiments. However, it may be on the normal drawn from the wall surface.

The projecting dimension of the projections from the outer surface of the main body is equal to that of the hinges in the first to third embodiments, but the projecting dimension of the projections may be larger than that of the hinges.

The projecting dimension of the projection from the outer surface of the main body is larger than that of the hinges in the fourth embodiment. However, the projecting dimension of the projection may be equal to that of the hinges.

REFERENCE SIGNS 10, 50, 52, 55 . . . cover
11 . . . main body
18 . . . first accommodation space
19 . . . opening
21 . . . lid
25, 51, 53, 56 . . . hinge
26, 54, 57 . . . projection
27 . . . guiding surface
30 . . . battery terminal
40 . . . battery
42 . . . battery post
44 . . . rear wall surface
N . . . normal drawn from wall surface

What is claimed is:

1. A battery terminal cover for at least partly accommodating a battery terminal to be connected to a battery post, comprising:
a main body including an accommodation space for at least partly accommodating the battery terminal and an opening for at least partly opening the accommodation space to outside;
a lid displaceable between a closing position for at least partly closing the opening and an opening position for at least partly opening the opening;
at least one deformable hinge having a first end joined to an outer surfaces of the main body and a second end joined to the lid so that the at least one deformable hinge couples the main body and the lid and so the at least one deformable hinge deforms as the lid is displaced between the opening position and the closing position; and
projections projecting from the outer surface of the main body and/or from the lid at positions near to the at least one deformable hinge but spaced sufficiently from the at least one deformable hinge to permit deformation of the at least one deformable hinge as the lid is displaced between the opening position and the closing position, and the projections having a projecting dimension equal to or larger than a projecting dimension of the at least one deformable hinge.

2. The battery terminal cover of claim 1, wherein two of the projections are arranged to sandwich the hinge.

3. The battery terminal cover of claim 1, wherein:
the battery terminal cover is mountable on a battery having a wall surface facing an outer peripheral surface of the battery post and substantially parallel to a wall surface;
the projections are arranged to substantially face the wall surface (44); and/or
the projections are formed with at least one guiding surface inclined with respect to the wall surface.

4. The battery terminal cover of claim 1, wherein:
the battery terminal cover is mountable on a battery having a wall surface facing an outer peripheral surface of the battery post;
the projections are arranged to substantially face the wall surface and capable of contacting the wall surface when the orientation of the main body is changed about the battery post; and
the hinge does not come into contact with the wall surface when the one of the projections comes into contact with the wall surface.

5. The battery terminal cover of claim 1, wherein:
the battery terminal cover is mountable on a battery having a wall surface substantially facing an outer peripheral surface of the battery post; and
the projections substantially face the wall surface and is arranged at a position not corresponding to a normal drawn from the wall surface toward a center of the battery post on a plane of projection perpendicular to an axis line of the battery post.

6. A battery having a battery post to which a battery terminal is to be connected and a battery terminal cover for at least partly accommodating the battery terminal (30), the battery terminal cover (10; 50; 52; 55) comprising:
a main body including an accommodation space for at least partly accommodating the battery terminal and an opening for at least partly opening the accommodation space to outside;
a lid displaceable between a closing position for at least partly closing the opening and an opening position for at least partly opening the opening;
at least one deformable hinge having a first end joined to an outer surfaces of the main body and a second end joined to the lid so that the at least one deformable hinge couples the main body and the lid and so the at least one deformable hinge deforms as the lid is displaced between the opening position and the closing position; and
projections projecting from the outer surface of the main body and/or the lid at positions near to the at least one deformable hinge but spaced sufficiently from the at least one deformable hinge to permit deformation of the at least one deformable hinge as the lid is displaced between the opening position and the closing position, and the projections having a projecting dimension equal to or larger than a projecting dimension of the at least one deformable hinge.

7. The battery of claim 6, wherein two of the projections are arranged to sandwich the hinge.

8. The battery of claim 6, wherein:
the battery terminal cover is mounted on a battery having a wall surface facing an outer peripheral surface of the battery post substantially parallel to a wall surface;

the projections are arranged to substantially face the wall surface; and/or the projections formed with at least one guiding surface inclined with respect to the wall surface.

9. The battery of claim 6, wherein:

the battery terminal cover is mounted on a battery having a wall surface facing an outer peripheral surface of the battery post;

the projection are arranged to substantially face the wall surface and capable of coming into contact with the wall surface when the orientation of the main body is changed about the battery post; and the hinge does not come into contact with the wall surface when one of the projectings comes into contact with the wall surface.

10. A battery of claim 6, wherein:

the battery terminal cover is mounted on a battery having a wall surface substantially facing an outer peripheral surface of the battery post; and the projections substantially faces the wall surface and is arranged at a position not corresponding to a normal drawn from the wall surface toward a center of the battery post on a plane of projection perpendicular to an axis line of the battery post.

* * * * *